(12) United States Patent
Petouhoff et al.

(10) Patent No.: US 8,556,319 B2
(45) Date of Patent: Oct. 15, 2013

(54) LASER ETCHED TRIM

(75) Inventors: Nicholas Petouhoff, South Lyon, MI (US); Bonnie L. Coker, Whitmore Lake, MI (US); Todd W. Waelde, Livonia, MI (US); Daniel J. LaFlamme, Wixom, MI (US); Gregg R. Laframboise, Windsor (CA); Daniel J. Sakkinen, Highland, MI (US); Mark S. Jurek, West Bloomfield, MI (US)

(73) Assignee: Johnson Controls Technology Company, Holland, MI (US)

( * ) Notice: Subject to any disclaimer, the term of this patent is extended or adjusted under 35 U.S.C. 154(b) by 102 days.

(21) Appl. No.: 12/869,819

(22) Filed: Aug. 27, 2010

(65) Prior Publication Data

US 2011/0109111 A1    May 12, 2011

Related U.S. Application Data

(60) Provisional application No. 61/237,782, filed on Aug. 28, 2009, provisional application No. 61/265,877, filed on Dec. 2, 2009, provisional application No. 61/292,035, filed on Jan. 4, 2010.

(51) Int. Cl.
*B60R 13/02* (2006.01)

(52) U.S. Cl.
USPC .......................... 296/1.08; 264/400

(58) Field of Classification Search
USPC ......... 296/1.08; 362/153, 249.02, 249.04, 29, 362/551; 264/400
See application file for complete search history.

(56) References Cited

U.S. PATENT DOCUMENTS

| | | | | |
|---|---|---|---|---|
| 5,650,115 A | * | 7/1997 | Proos et al. | 264/400 |
| 5,744,776 A | * | 4/1998 | Bauer | 219/121.7 |
| 7,201,508 B2 | * | 4/2007 | Misaras | 362/551 |
| 7,857,474 B2 | * | 12/2010 | Selby et al. | 362/97.1 |
| 2004/0164531 A1 | * | 8/2004 | Riha et al. | 280/732 |
| 2005/0202268 A1 | * | 9/2005 | Kotter et al. | 428/540 |
| 2007/0284169 A1 | * | 12/2007 | Zabiega | 180/90 |
| 2011/0049766 A1 | * | 3/2011 | Del Mundo et al. | 264/400 |
| 2011/0180294 A1 | * | 7/2011 | Qin et al. | 174/50 |

FOREIGN PATENT DOCUMENTS

| | | |
|---|---|---|
| DE | 10 2007 061170 A1 | 6/2009 |
| WO | 2004/046389 A2 | 6/2004 |
| WO | 2009/065103 A2 | 5/2009 |
| WO | 2011/068864 A1 | 6/2011 |

OTHER PUBLICATIONS

International Preliminary Report of Patentability, of corresponding PCT Application. No. US2010/058550 dated Jun. 14, 2012.
International Search Report dated Mar. 21, 2011, International Appln. No. PCT/US2010/058550.

* cited by examiner

*Primary Examiner* — Glenn Dayoan
*Assistant Examiner* — Pinel Romain
(74) *Attorney, Agent, or Firm* — The Dobrusin Law Firm, PC

(57) ABSTRACT

The present invention relates to a process for the production of a trim cover and the cover of a trim interior itself.

14 Claims, 24 Drawing Sheets

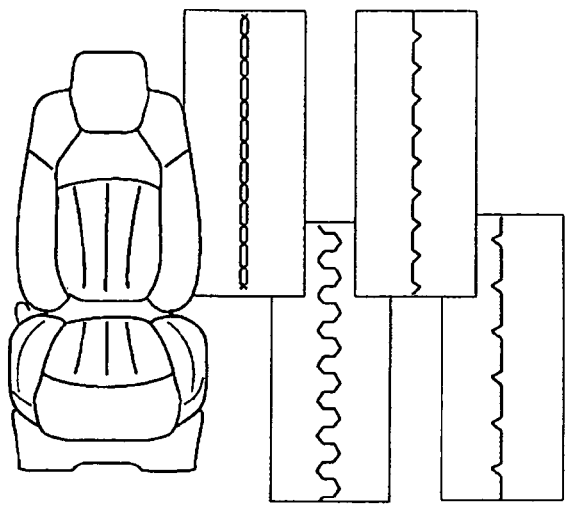
Fig. 15
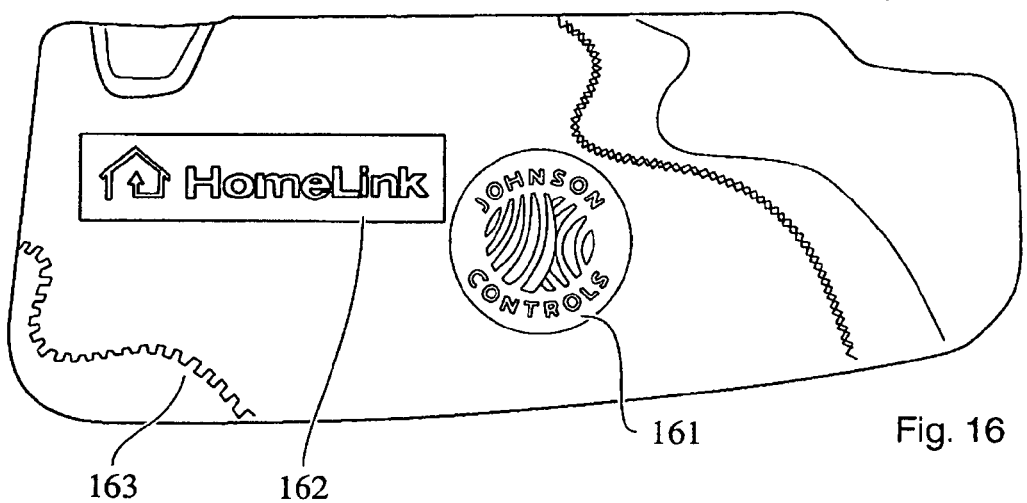
161  Fig. 16
163  162
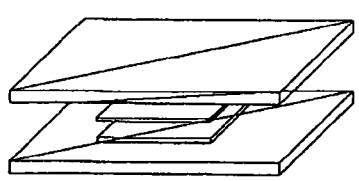
Fig. 19
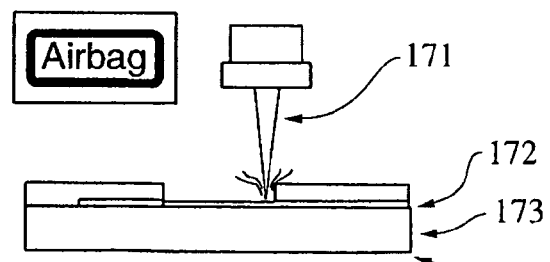
171
172
173
174
Fig. 17
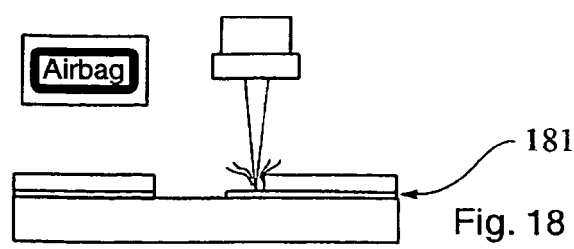
181
Fig. 18

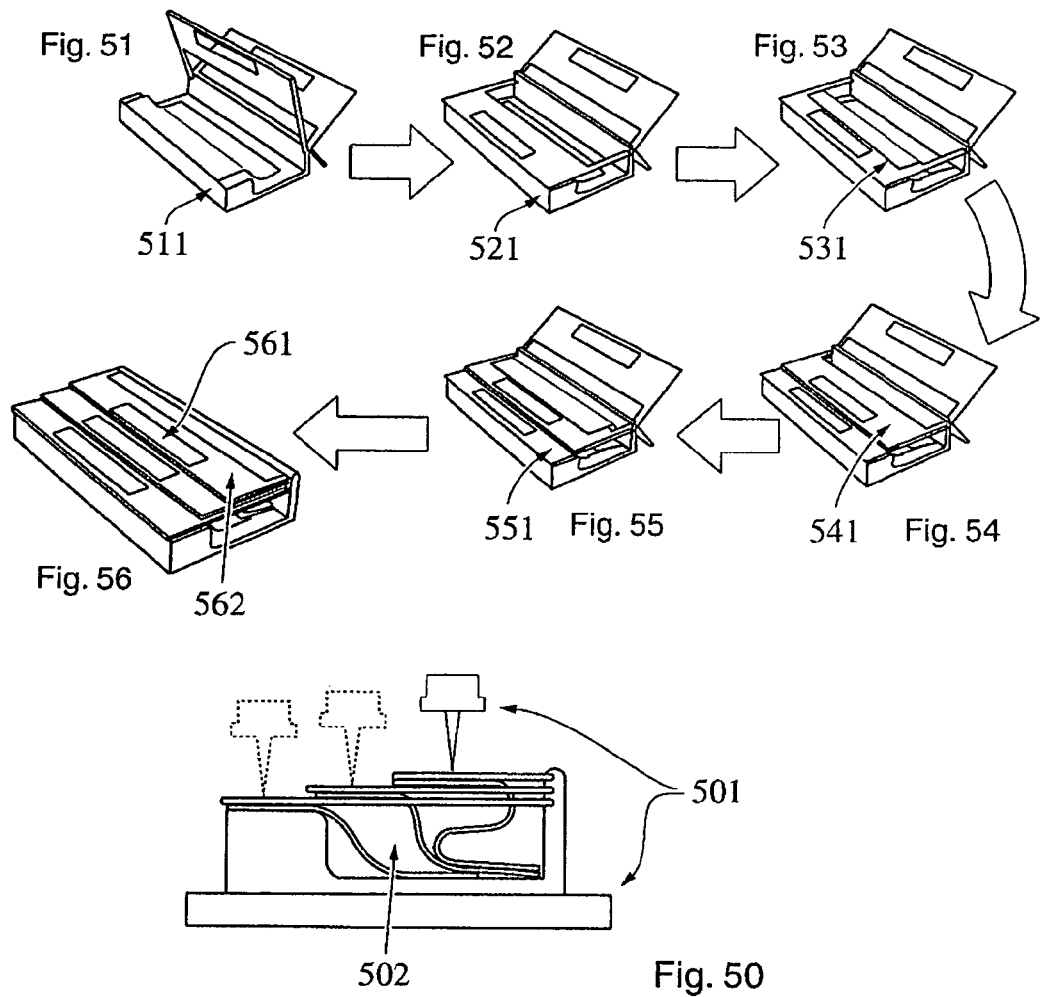

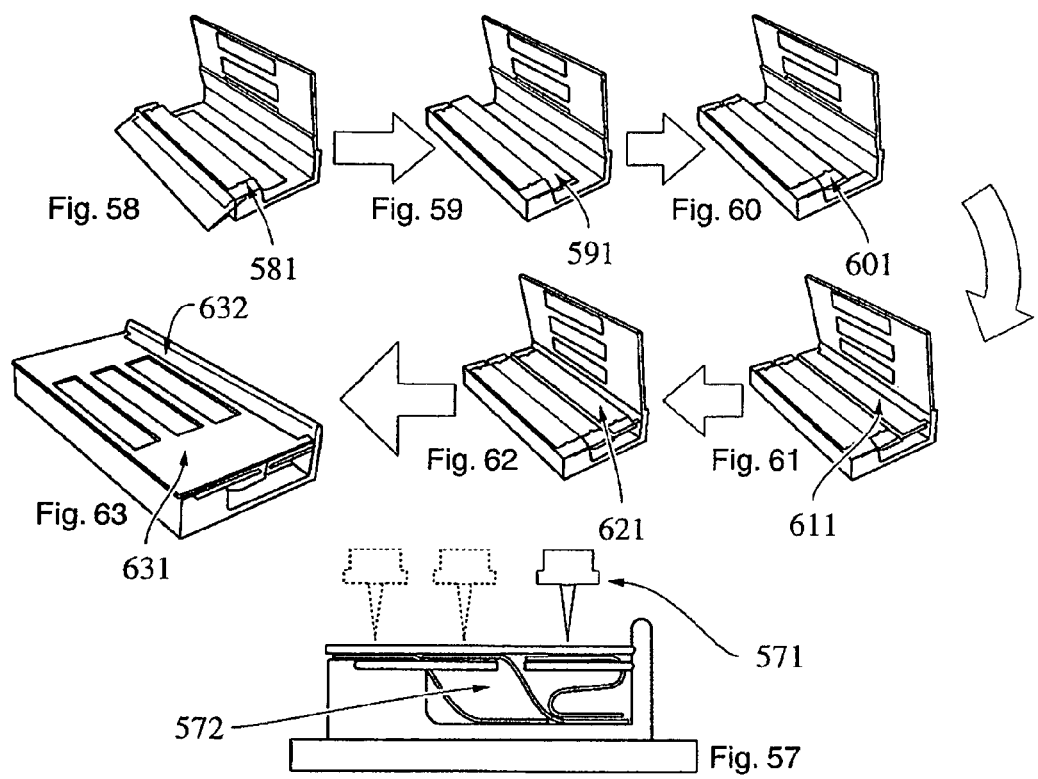
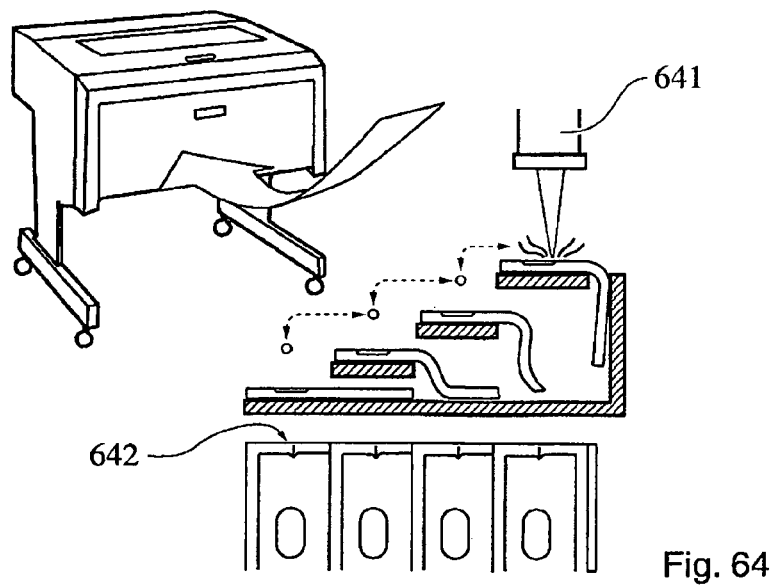

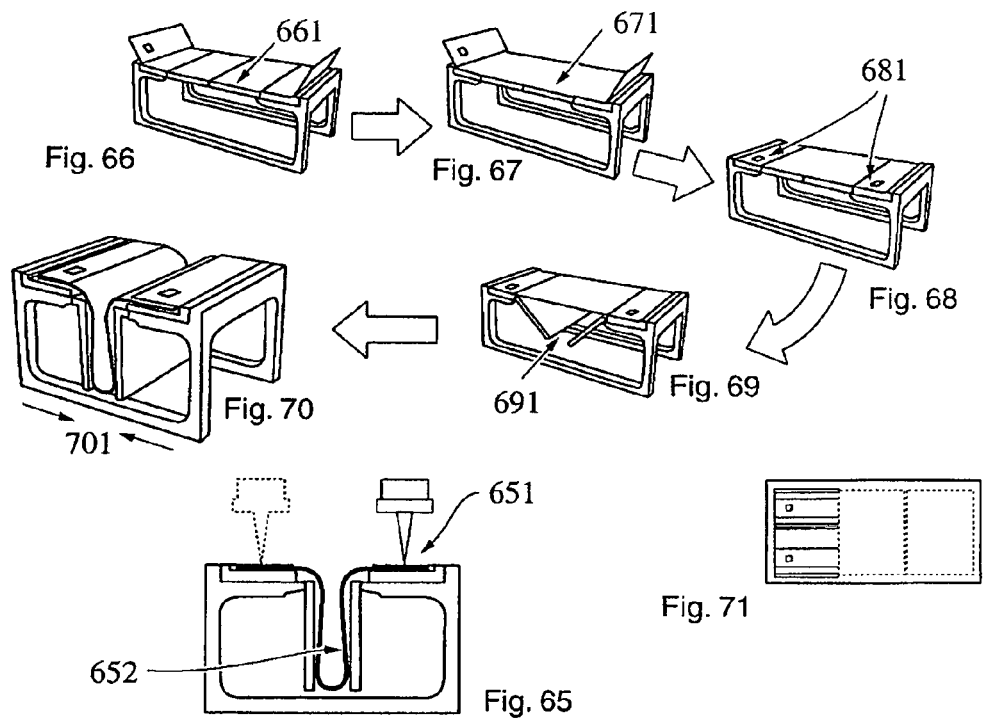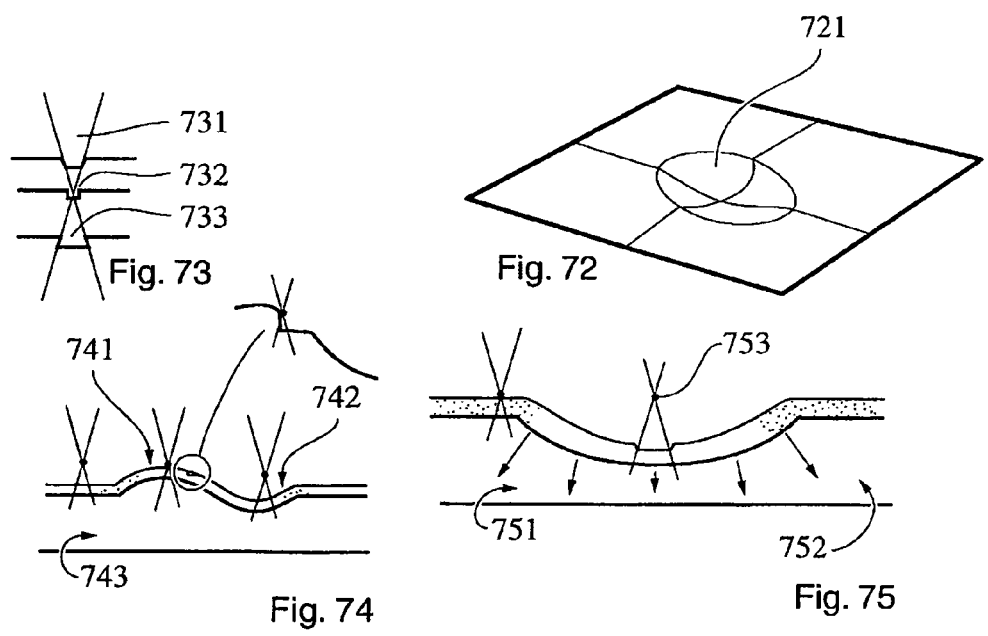

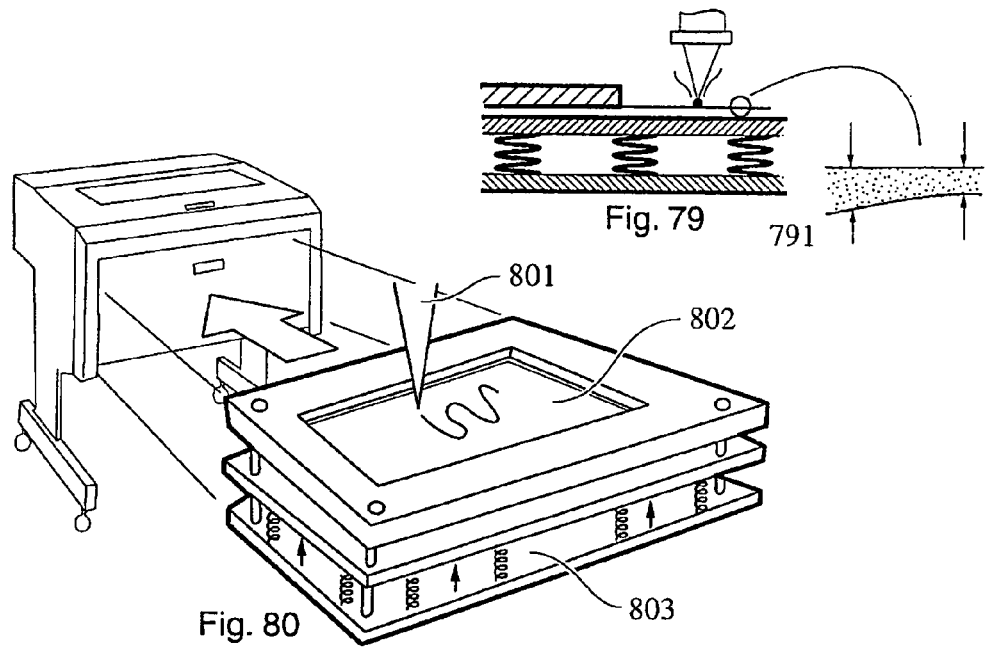
Fig. 79
Fig. 80
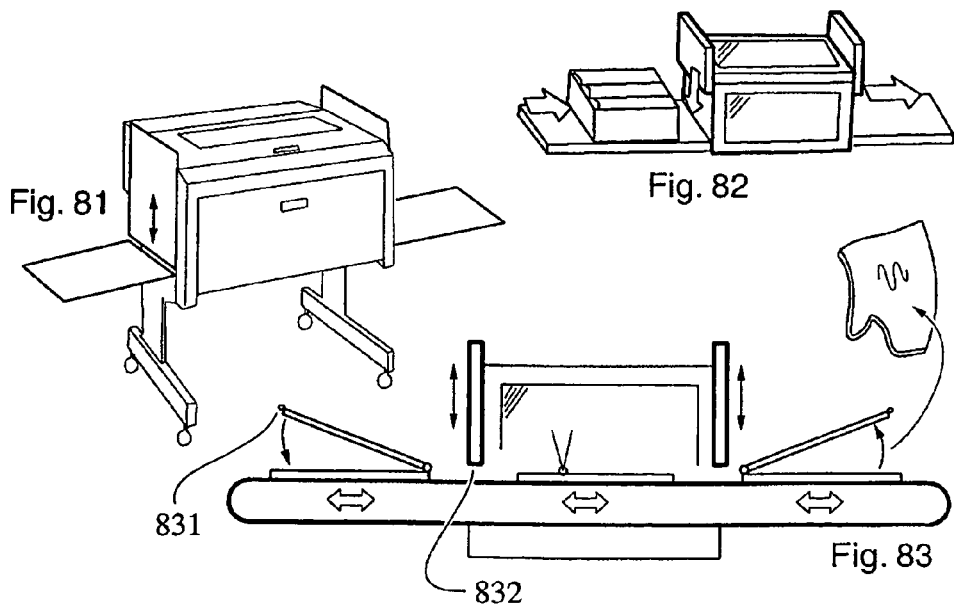
Fig. 81
Fig. 82
Fig. 83

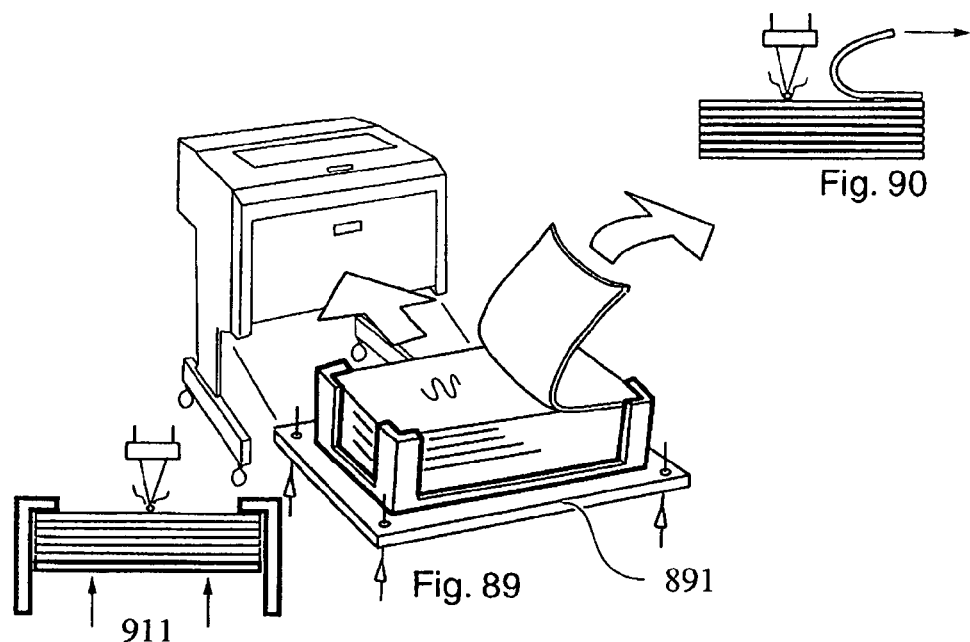
Fig. 90
Fig. 89
Fig. 91
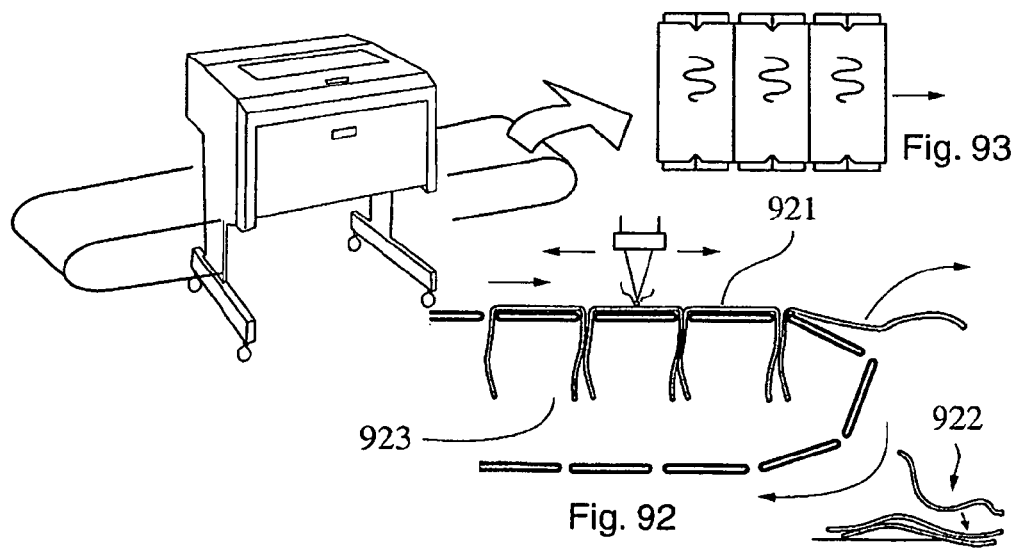
Fig. 93
Fig. 92

LASER ETCHED TRIM

CLAIM OF BENEFIT OF FILING DATE

The present application claims the benefit of the filing date of U.S. Provisional Application Ser. No. 61/237,782, filed Aug. 28, 2009; 61/265,877, filed Dec. 2, 2009 and 61/292,035, filed Jan. 4, 2010, hereby incorporated by reference.

BACKGROUND OF THE INVENTION

1. Field of the Invention

The present invention relates to a process for the production of a trim cover and the cover of a trim interior itself.

2. Background of the Invention

Trim covers, for example seat covers, which are made from fabric, leather and/or faux-leather have a number of tags or labels, which are applied e.g. sewn to the cover.

However, this process is very time consuming and thus costly. Alternatively, the tags or symbols can be etched into the cover, which however, weakens the structure of the cover.

It was therefore the problem of the present invention to provide a process for the production of a trim in the interior of a vehicle, which is more efficient.

SUMMARY

The present invention relates to a process for the production of a trim cover for example a door trim, a seat cover, a dashboard trim and/or a car body trim. Other applications include visors, sun visors, overhead consoles, door panels, instrument panels or the like.

This trim has a cover with an A-surface, which is directed towards the interior of the car; i.e., which is visible for the vehicle occupant. The cover can be made of a fabric, leather and/or faux-leather and/or a combination of these materials. The fabric can be based on a natural and/or a synthetic material. The A-surface of the cover is, according to the present invention, treated with a laser-beam to apply a graphic element and/or a pattern to the A-surface, so that this graphic element and/or this pattern is visible and/or tactile for the occupant of the vehicle.

A graphical element according to the present invention is any element comprising for example letters, numbers, symbols, logos, arrows, mathematical symbols, pictograms and/or a combination of these elements. The graphical element can be applied to the A-surface such that it has a 2-D- or 3-D-look-and-feel. The laser fuses and/or removes the material of the cover, e.g. fibers/filaments, at least partly rather than breaking them. Thus, the structure of the cover is not or not significantly weakened by the treatment with the laser.

The pattern can be any pattern known by a person skilled in the art. Preferably, the pattern is a simulated stitch, so that the pattern has an appearance as if the cover had been sewn together.

Both decorative and functional elements can be etched on the trim cover or cover by means of the laser beam. According to an embodiment of the present invention, the laser beam can be applied to the A-surface. According to an alternative embodiment of the present invention, it is also possible that the application of the laser beam is made on the B-surface of the trim cover or cover, i.e. the surface of the cover which is normally not visible by a vehicle user or passenger.

Due to the application of the laser, especially to the A-surface of the cover, the tacticle of the cover is preferably locally changed.

According to the present invention, it is also possible that the color of the cover is locally changed.

Already by means of only one material present in the application region of the laser beam, it is possible to change the color of the cover because the color of the laser beam treated material surface can be different from the color of the material which is not treated by the laser beam.

Additionally, it is also possible to use two or even more materials (of different colors, such as color layers or the like that can be provided locally in the region of the graphic element and/or pattern) such that by removing a top layer of the cover, another color is visible by a user of the cover.

Preferably, the graphic element is a safety element, indicating for example where an airbag is located and/or where the connections for a child car seat, e.g. Isofix, is located.

Furthermore, the laser treated part of the cover can be the cover for a soft switch, for example a soft switch located at a vehicle seat. This soft switch can be, for example, part of a mechanism to actuate the position and/or the shape of a seat.

The present invention is now explained according to FIGS. 1 to 95. These explanations do not limit the scope of protection of the present invention.

BRIEF DESCRIPTION OF THE FIGURES

FIG. 15 show a car seat with a cover and details of a graphic element and/or pattern.
FIG. 16 shows a sun visor with a cover and details of a graphic element and/or pattern.
FIGS. 17, 18 and 19 show processes and a material for providing different colors of a graphic element and/or pattern.

DETAILED DESCRIPTION

Figure 1:
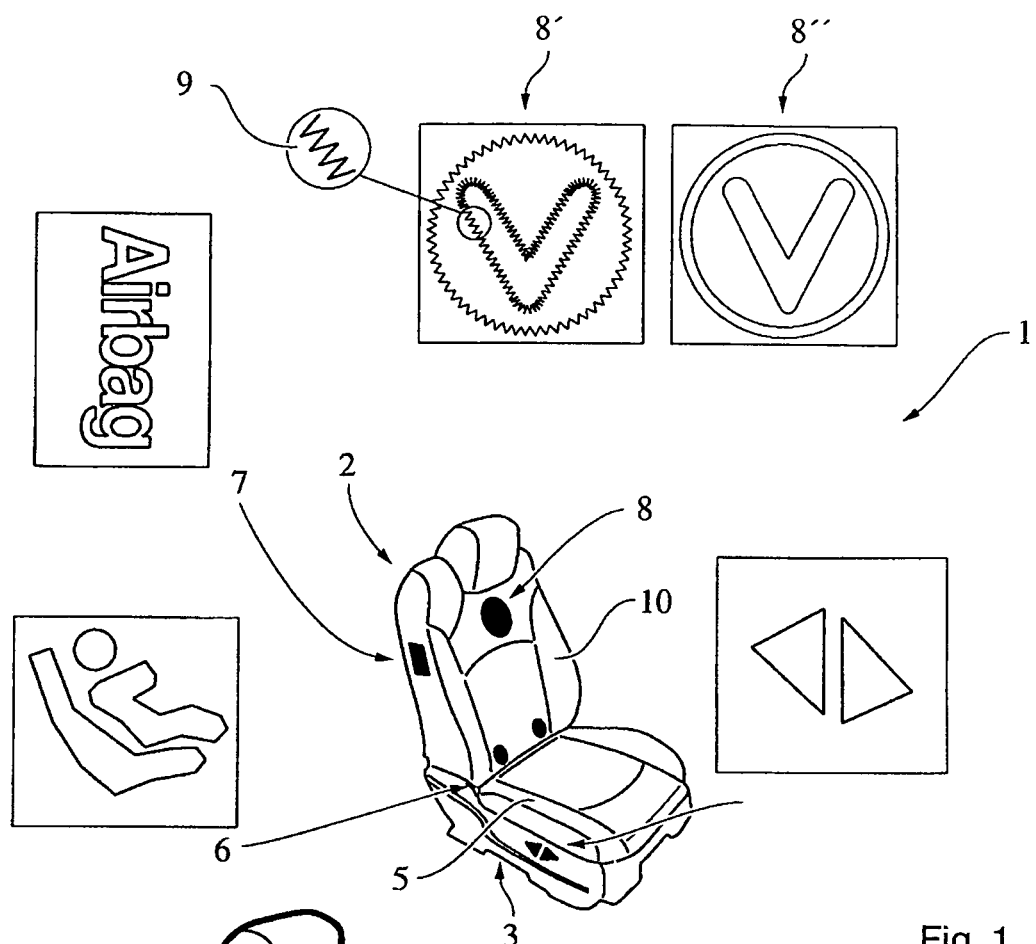
FIG. 1 shows a car seat with a cover and details of a graphic element and/or pattern.

FIGS. 1 and 15 show a vehicle seat, which can be located anywhere within the car. The seat can be also a bench, which provides space for more than one vehicle occupant. This vehicle seat 1 comprises a seat 3 and the seat back 2, each having a cover 5, 10, which covers the structure and/or the cushion of the seat 3 and/or the seat back 2, respectively. On these covers 5, 10, graphical elements as well as logos are applied by a laser-beam. This application can be executed prior to fixing the cover to the seat 3 or the seat back 2. However, the graphical elements and/or the pattern can also be applied on the cover when the cover has already been put on the seat or the seat back. In the present application, the graphical elements are the cover of a soft switch 4; i.e. arrows which indicate the direction into which the seat can be moved longitudinally. The graphical elements are visible as well as tactile, so that a seat occupant can actuate the seat without looking at the switch. The arrows have been applied to the A-surface by means of a laser. Furthermore, the cover comprises an isofix label 6, which is also etched into the A-surface of the cover by a laser in order to indicate in which locations a car child seat should be attached to the seat. Furthermore, the seat according to the present invention comprises an airbag tag, which is also etched into the A-surface of the seat cover 10 by a laser in order to indicate at which location an airbag is provided in order to individualize the seat. The seat according to the present invention also comprises a branding which is applied to the A-surface of the cover with a laser. The laser can be moved such that it simulates a stitching pattern, so that the seat occupant has the impression, that the branding or any other graphical element or pattern has been stitched into the seat cover rather than applied by a laser. According to the present invention, it is possible that a custom branding or a logo 8 is provided on the A-surface. According to enlarged parts of FIG. 1, a 2-D element 8' of a custom branding or a logo is shown with a simulated stitch and a 3-D-pattern 8" of a custom branding or a logo is shown, i.e., the depth of the laser etching is increased. In FIG. 15, possible details of a graphic element and/or pattern, such as a decorative sewing theme, are shown.

Figure 2:
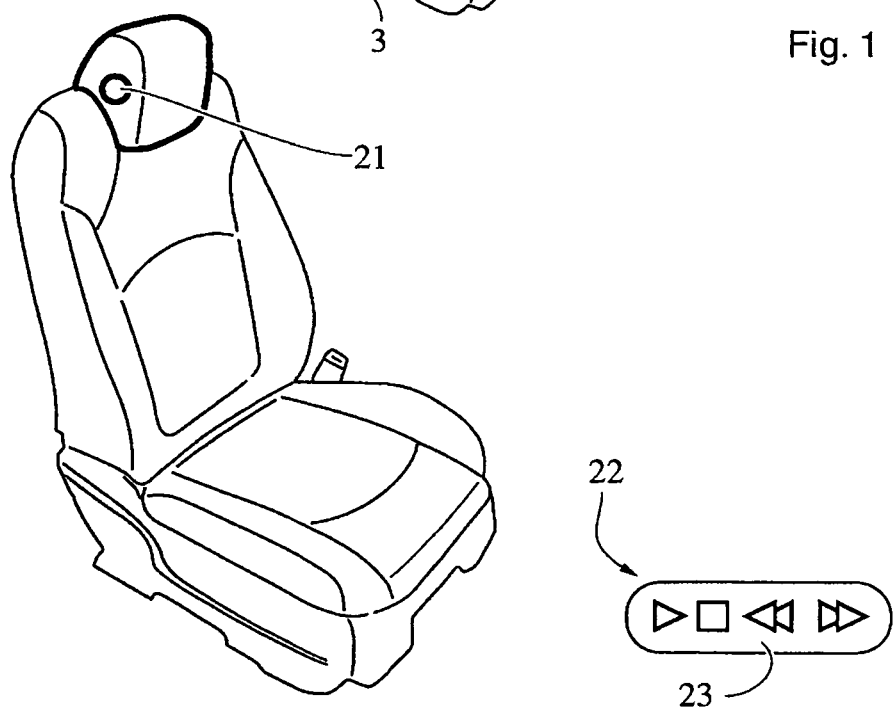
FIG. 2 shows an application with headrest-buttons

FIG. 2 shows an application where tactile changes have been added for example to the cover of the headrest of a seat to indicate buttons for example for kids to operate a DVD or CD-system. The mechanical or electronic components for the DVD systems are preferably located under the trim of the seat here the trim of the headrest. Reference sign 21 indicates a button of a headrest, wherein the mechanic components are located under the trim. Reference sign 22 indicates DVD buttons or TIC-TAC-TOW buttons that are etched in the trim, for example, for kids. Reference sign 23 indicates a tactile change due to the etching in the trim.

Figure 3:
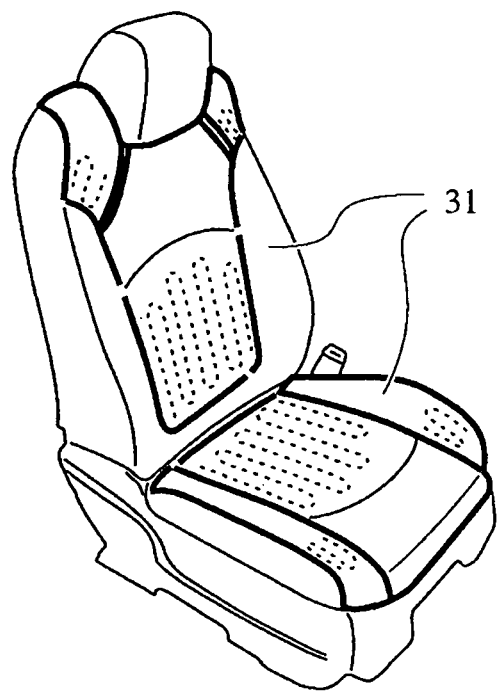
FIG. 3 shows an application with perforations

FIG. 3 shows a custom made perforation which is for example not needed on the entire panel. Perforation is made with laser etching. Reference sign 31 refers to a custom perforation. Such a custom perforation is not needed on the entire panel and could be applied only where it is needed.

Figure 4:
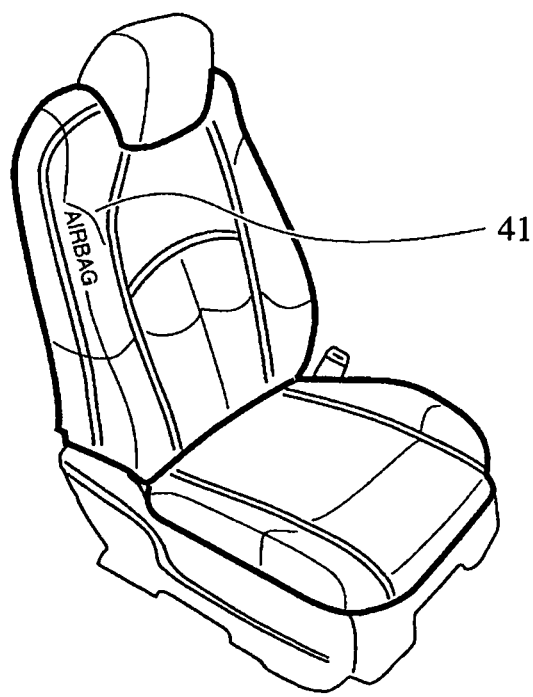
FIG. 4 shows an application for airbags

FIG. 4 shows an application where a perforation has been etched by a laser into the trim in order to create a controlled exit point for example for an airbag. FIG. 4 shows a unique saw seam which is not in an airbag path. Reference sign 41 shows the airbag zone etched for a controlled exit point of an airbag.

Figure 5:
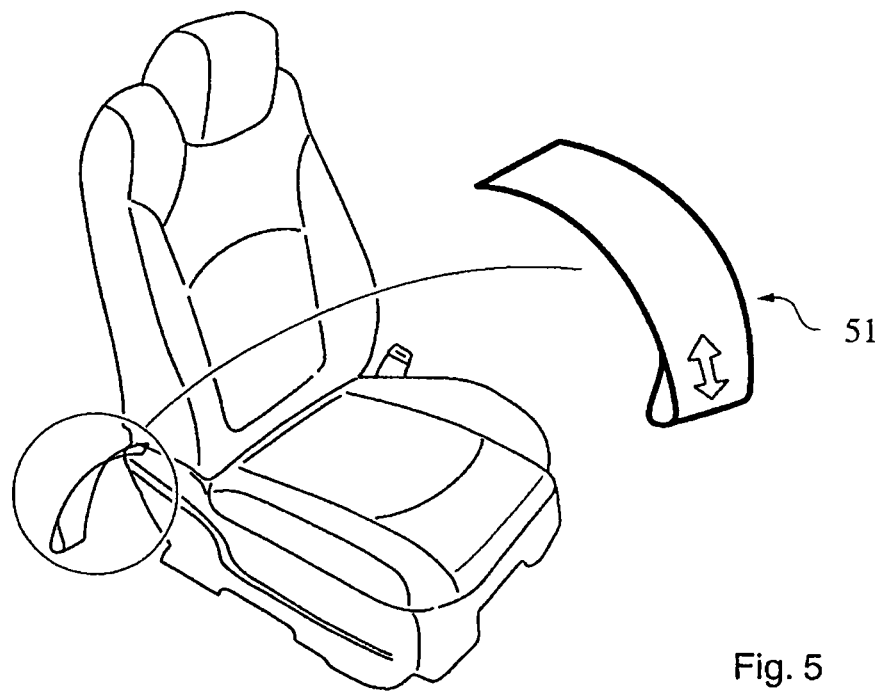
FIG. 5 shows a strap

FIG. 5 shows a handle or a strap on which information has been etched by a laser. Reference number 51 illustrates a strap with instructions to pull and directional arrows, which can be utilized in seats to allow control of the seats.

Figure 6:
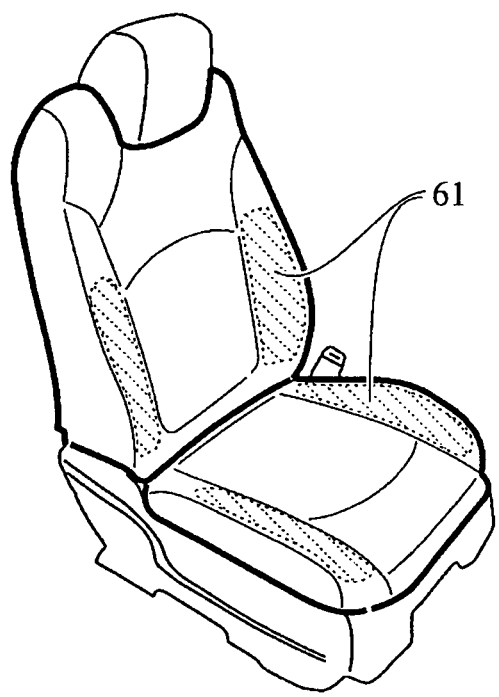
FIG. 6 shows a directional etching of the cover

FIG. 6 shows an application in which a directional etching has been applied to the trim of the seat for example either to hold an occupant in the seat or to allow easier egress. Reference sign 61 indicates a directional etching to either hold the occupant in place or to allow easier egress.

Figure 7:
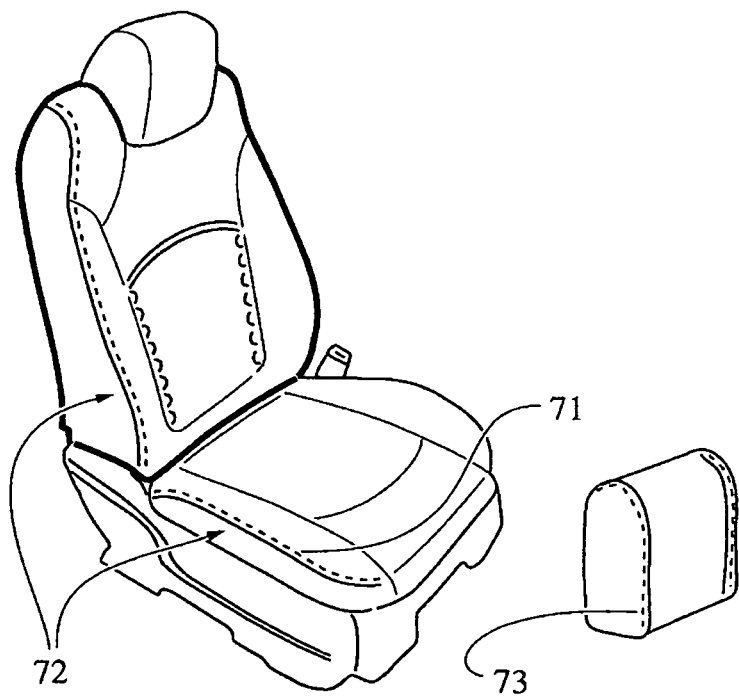
FIG. 7 shows a molded cover with simulated seams

FIG. 7 shows an application in which a molded trim seat is decorated with simulated seams. These seams have been applied by a laser-beam. FIG. 7 especially shows a molded trim seat with simulated deck seams, especially combined with radio frequency weld or trim bonded to make a one-piece trim cover and to etch typical deck seams. Reference sign 71 indicates an etched deck seam. Reference 72 indicates a radio frequency welded seam. Reference 73 indicates etched seams in a pour-in-place headrest, i.e. a headrest where at least part of the cushion (usually of a foam material) has been shaped with the cover or trim material being in place.

Figure 8:
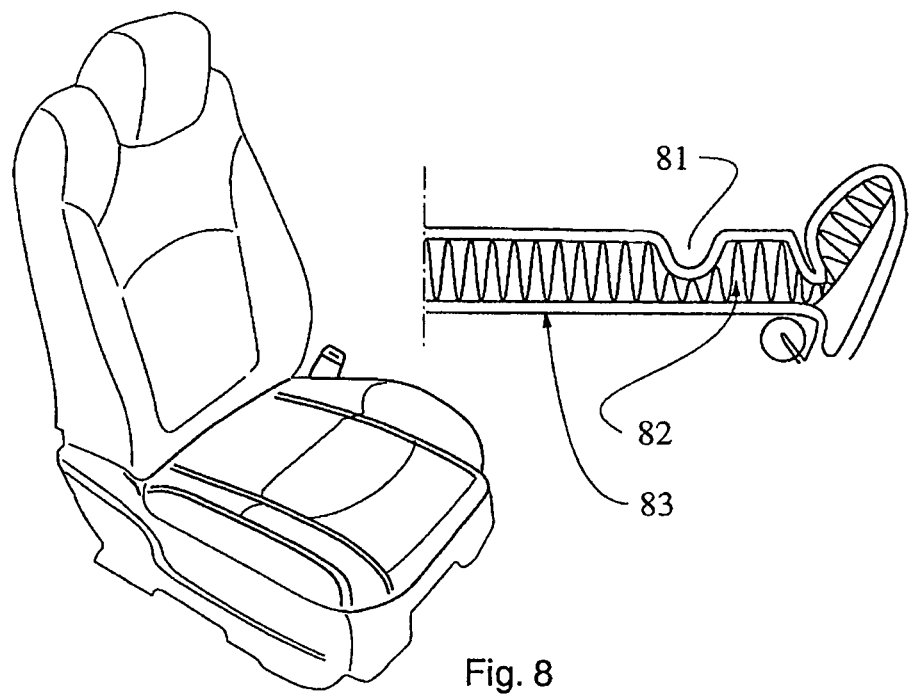
FIG. 8 shows a spacer made by a laser

FIG. 8 shows an application in which a spacer has been inserted into the trim and/or the flexible material of a seat. This application is especially useful for light weight seats which are normally very flat. FIG. 8 shows a definition for a spacer fabric in a light weight seat. Reference sign 81 indicates a burned or etched out portion. Reference sign 82 indicates a spacer pad insert. Reference sign 83 indicates a suspension made from a flexible material.

Figure 9:
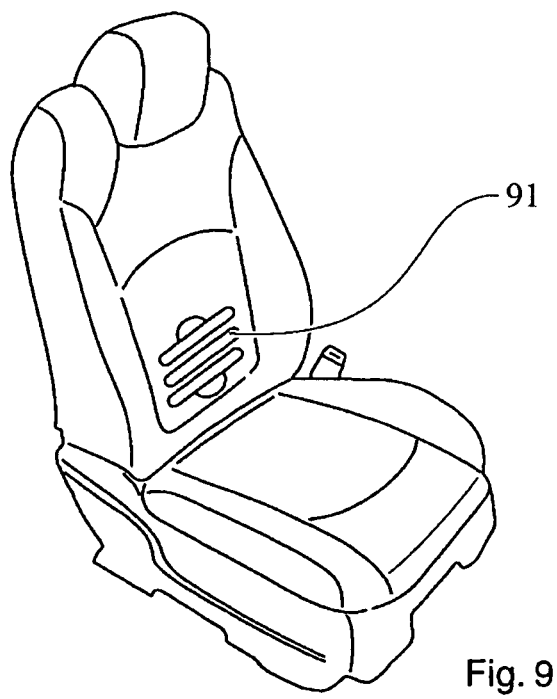
FIG. 9 shows an application with laser and ink

FIG. 9 shows an application in which surface details have been etched into the trim. This method can be combined with ink-technology. Reference sign 91 indicates an etched in surface detail combined with ink technology to show off seat control.

Figure 10:
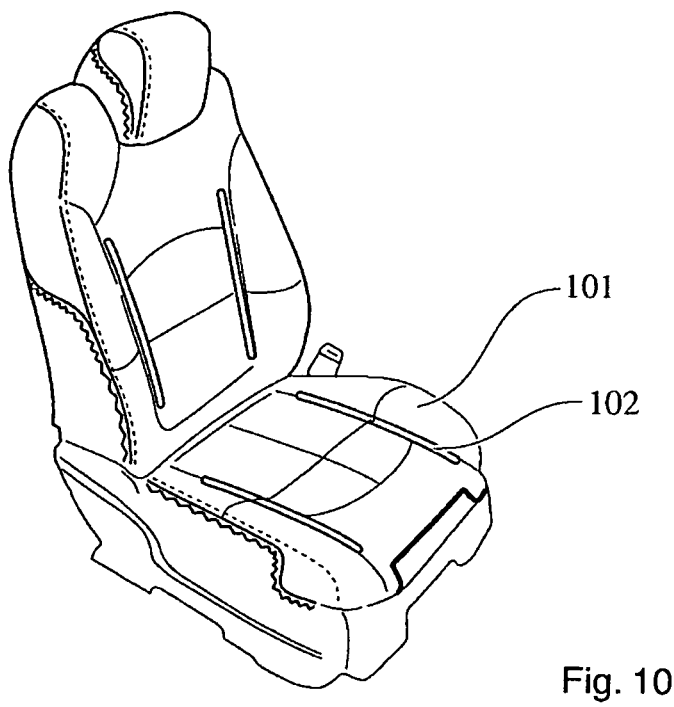
FIG. 10 shows the application of graphic break-up to the seat cover

FIG. 10 shows unique graphic-elements which have been added to the trim of the cover in order to improve the appearance of the seat. FIG. 10 shows a unique graphic break-up, namely a way to add a two-dimensional interest graphic to a basis level economy trim cover. Reference sign 101 indicates a one-piece trim cover. Reference sign 102 indicates a thick-to-thin element.

Figure 11:
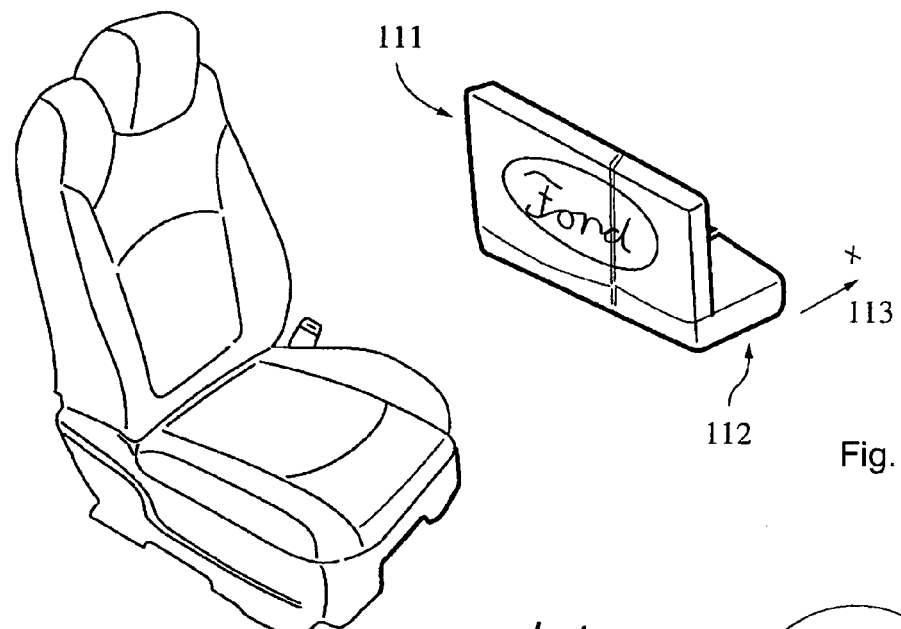
FIG. 11 shows the application of a logo into carpet

FIG. 11 shows a seat which has a carpet on its backside so that the seat back can also be used as the floor of a loading zone. With a laser a logo has been etched into the seat cover; i.e. the carpet. Reference sign 111 shows a rear second row logo in carpet. Reference sign 112 shows a second row seat. Reference sign 113 indicates the front direction of the vehicle.

Figure 12:
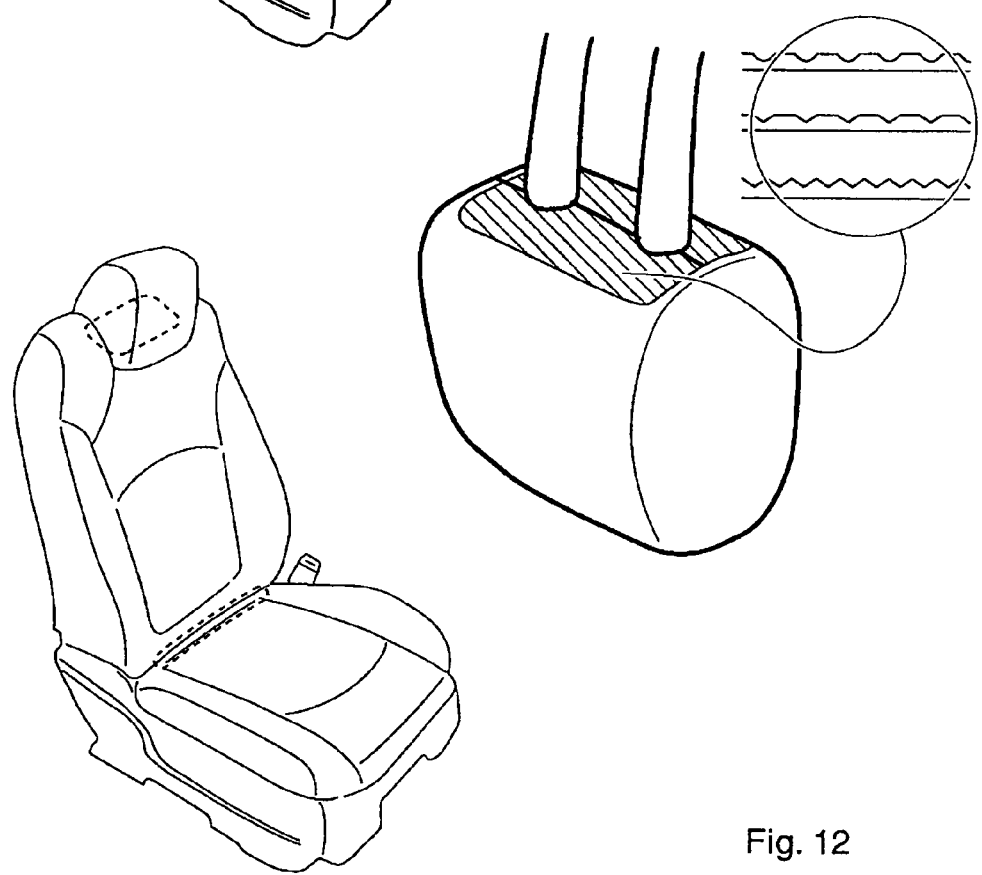
FIG. 12 shows an application of laser etching in the bite line of a vehicle-seat

FIG. 12 shows an application in which laser etching has been applied to the bite lines of a seat and/or a headrest. FIG. 12 shows a headrest having a bite line bolster to bolster. The etched surface change to eliminate BSR. This advantageously reduces the part complexity.

Figure 13:
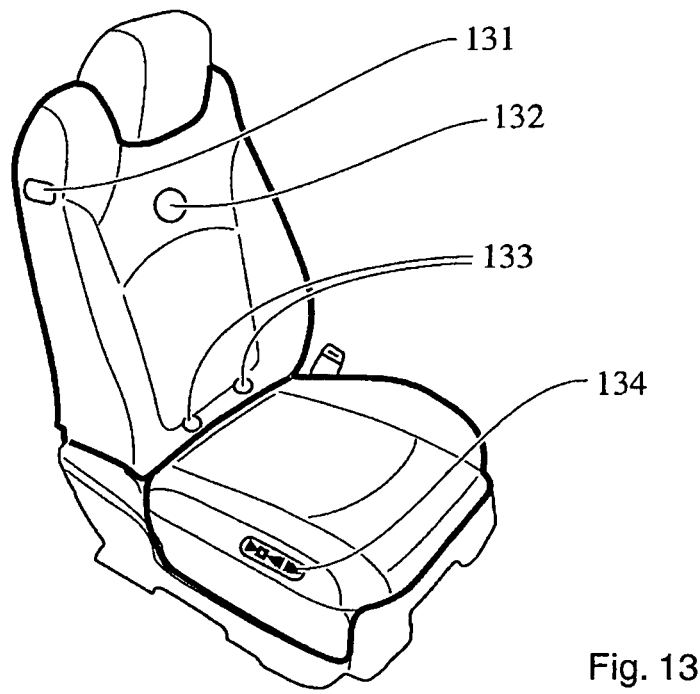
FIG. 13 shows the addition of a labels to the cover of seat cover

FIG. 13 shows the addition of labels to the seat for example to show the location of an airbag, to provide a logo or a branding, isofix labels to indicate where to fix a baby-seat on a seat or tactile changes in order to, for example, control the position and/or the shape of a seat. FIG. 13 shows the possibility of providing warning labels or labels providing instructions such as "pull here" or the like. Reference sign 131 refers to an airbag. Reference sign 132 refers to a logo or to a badging. Reference sign 133 refers to Isofix labels. Reference sign 134 refers to a tactile change, e.g. for soft touch controls, for example combined with capacitive switches.

Figure 14:
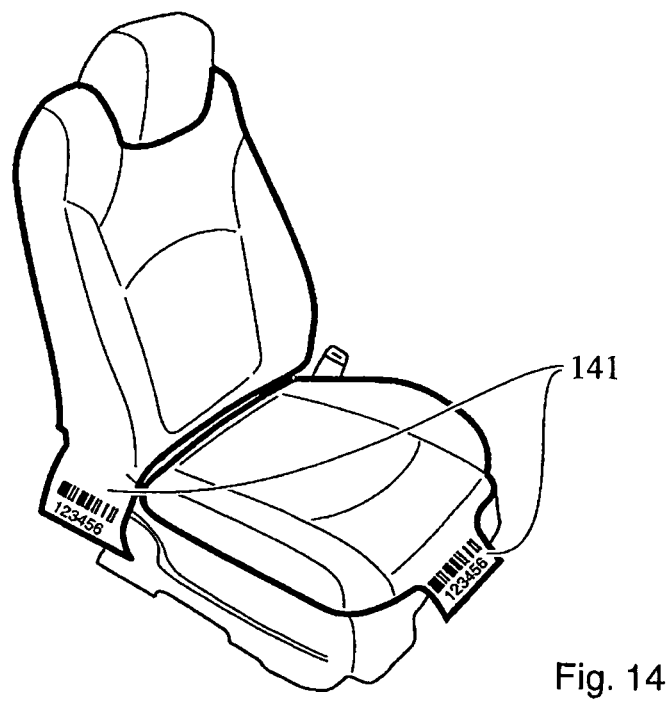
FIG. 14 shows the addition of identification to the cover of a seat.

FIG. 14 shows an application in which identification for example barcodes have been added to the cover of the seat by laser etching. Reference sign 141 illustrates the etching of information into a seat structure, such as part-numbers or barcodes or design labels, etc.

FIG. 15 shows a decorative sewing theme that can be carried over to a material wrapped substrate.

FIG. 16 shows the example of a sun visor having a cover with also a graphic element and/or a pattern being applied to the A-surface of the cover by means of the application of a laser beam. Graphical elements and/or pattern are also possible to be backlit in conjunction with a light source, e.g. an LED. Such a light source can be an existing light source like a vanity light of, e.g., the sun visor or an independent light source. Examples of such graphical elements are shown: reference sign 161 illustrates an etched logo with a corporate name, reference sign 162 illustrates an etched logo, reference sign 163 illustrates an etched stitching or pattern.

FIGS. 17 and 18 show two processes for providing different colors of a graphic element and/or pattern. FIG. 19 show a material for realizing such different colors: a layered film or another material is either locally placed or over an entire surface or surface part. According to FIG. 17, a color specific layer such as a film or other material is embedded in the material of the cover or trim cover. Especially, the color specific layer is embedded between the material of the A-surface (having preferably a different color than the color specific layer) and a backing material (usually a rigid substrate). In order to provide a different color impression on the A-surface of the cover, a laser beam shown in FIG. 17 removes partly the A-surface material such that the color specific layer (and its color) is visible for a user. According to FIG. 18, two color specific layers such as a film or other material are embedded in the material of the cover or trim cover. A first color specific material is located more closely to the A-surface and a second color specific material is located behind the first color specific material (i.e. on the side of the first color specific material opposite of the A-surface). Especially, the color specific layers are embedded between the material of the A-surface (having preferably a different color than the color specific layers) and a backing material (usually a rigid substrate). In order to provide a different color impression on the A-surface of the cover, a laser beam shown in FIG. 18 removes partly the A-surface material such that the first color specific layer (and its color) is visible for a user. In order to provide still another different color impression on the A-surface of the cover, a laser beam shown in FIG. 18 removes partly the A-surface material and the material of the first color specific layer such that the second color specific layer (and its color) is visible for a user. In FIG. 19, a cover material having two different color specific layers is shown; the layered film or material can be placed locally or over the entire surface. Reference sign 171 in FIG. 17 indicates a laser. Reference 172 in FIG. 17 indicates an A-surface material, i.e. a surface material that is visible for a user. Reference 173 in FIG. 17 indicates a color-specific layer, e.g. a film or another material. Reference sign 174 in FIG. 17 indicates a rigid substrate. Reference sign 181 in FIG. 18 indicate the possibility to adjust laser power to reveal multiple color layers, such as films or other materials.

Figure 20:
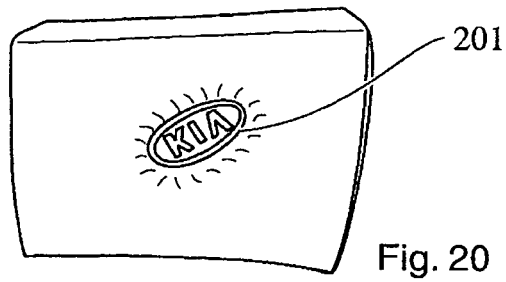
FIGS. 20 to 32 show applications of a graphic element and/or pattern being able to be backlit.
Figure 22:
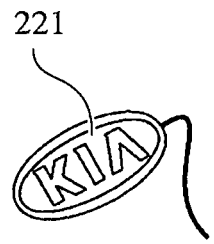
Figure 21:
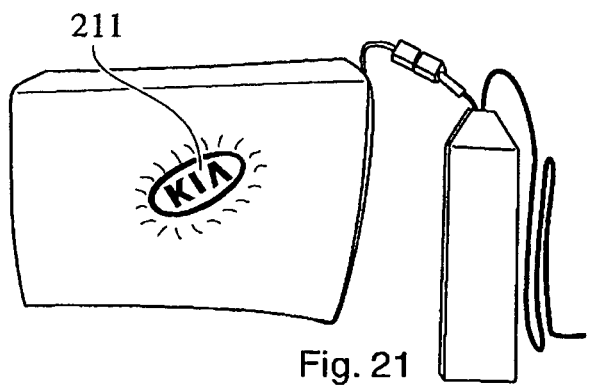
Figure 23:
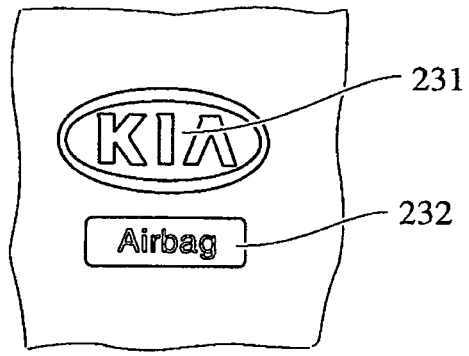
Figure 25:
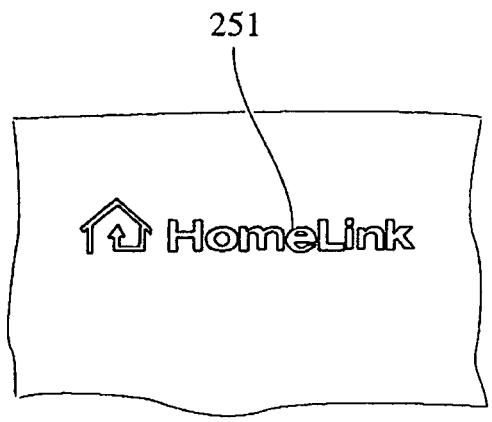
Figure 24:
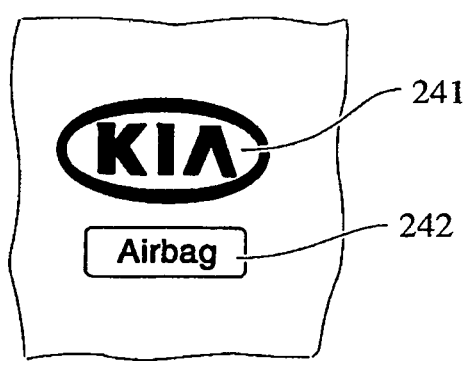
Figure 26:
Figure 27:
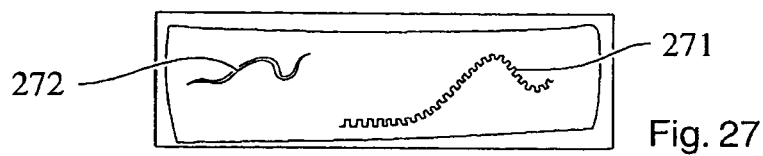
Figure 28:
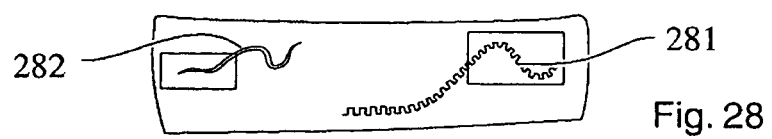
Figure 29:
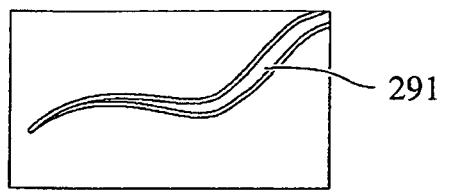
Figure 31:
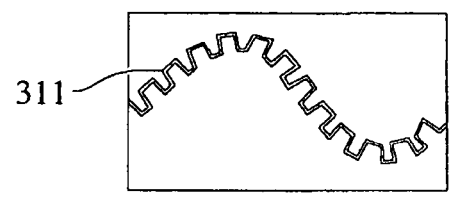
Figure 30:
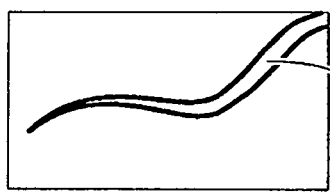
Figure 32:
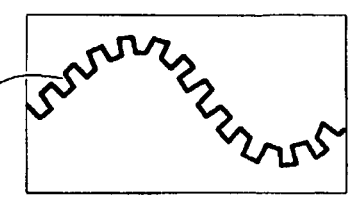
Figure 33:
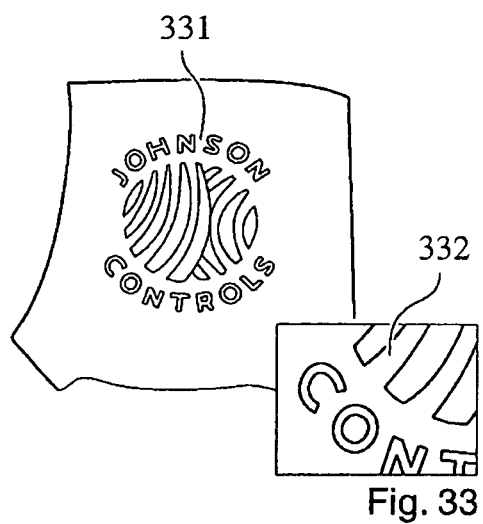
FIGS. 33 to 36 show applications of a graphic element and/or pattern without being backlit.
Figure 34:
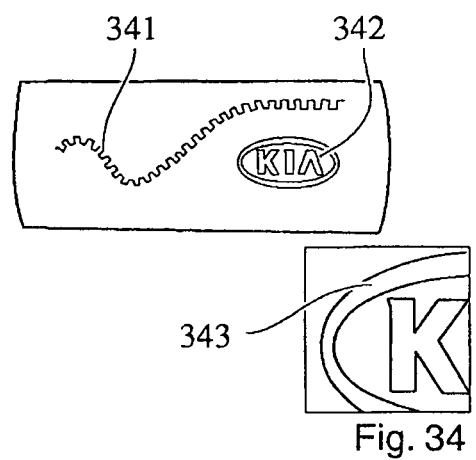
Figure 35:
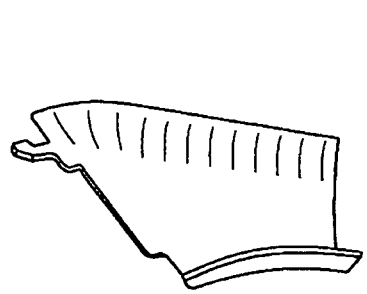
Figure 36:
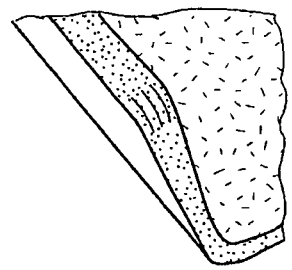

In FIGS. 20 to 36, different applications of a graphic element and/or pattern being able to be backlit are shown. The graphic element and/or pattern can be provided such that after the treatment of the A-surface material by the laser beam, the laser treated regions are more transparent for light compared to the surrounding regions of the cover. Thereby, it is possible that by means of a light source provided behind the cover, the graphic element and/or pattern can be backlit and provide both decorative and functional effects. As a light source, it is especially preferred that a LED (shown in FIGS. 24, 30, and 32) or another cost effective light source is used, preferably with an adhesive back to control the zone that is to able to be illuminated. According to a variant of the present invention, it is possible that a fluorescent backlighting is used. This is especially shown in FIGS. 26 and 28. According to the present invention, it is possible to archive a comparably high contrast between the laser etched areas (in darker color in the enlarged parts of FIGS. 33 and 34) on the one hand and the non-etched areas (in lighter color in the enlarged parts of FIGS. 33 and 34). According to the present invention, the inverse is also possible (i.e. that the laser-etched areas are provided with a lighter color and the non-etched areas are provided with a darker color). Furthermore, according to the present invention, the material used to be etched can be a compression molded substrate. Reference sign 201 in FIG. 20 indicates an etched logo and/or company name without being backlit. Reference sign 211 in FIG. 21 indicates an etched logo and/or company name being backlit by e.g. an LED-backlighting element. Reference sign 221 in FIG. 22 indicates an etched logo and/or company name that is backlit by means of an LED or other low cost light sources having an adhesive back to control the illuminated zone. Reference sign 231 in FIG. 23 indicates an etched logo and/or company name with no backlighting. Reference 232 in FIG. 23 indicates a graphical element such as the indication of an airbag zone, with no backlighting. Reference sign 241 in FIG. 24 indicates a logo and/or company name with a backlighting, preferably by means of an LED. Reference sign 242 in FIG. 24 indicates a graphical element such as an indication of an airbag zone with backlighting especially by means of an LED. Reference 251 in FIG. 25 indicates a logo and/or company name with no backlighting. Reference 261 in FIG. 26 indicates a logo and/or company name having a backlighting, especially a fluorescent backlighting. Reference signs 271 and 272 in FIG. 27 indicate an etched stitching or pattern having no backlighting. Reference signs 281 and 282 in FIG. 28 represent an etched stitching or pattern having backlighting, especially a fluorescent lighting behind the stitching or pattern. Reference sign 291 in FIG. 29 indicates an enlarged representation of the etched stitching or pattern 272 of FIG. 27, i.e. without a backlighting. Reference sign 301 of FIG. 30 indicates an enlarged representation of the etched stitching or pattern 282 of FIG. 28, i.e. with a backlighting. Reference sign 311 indicates an enlarged representation of the etched stitching or pattern 271 of FIG. 27, i.e. without a backlighting. Reference sign 321 of FIG. 32 indicates an enlarged representation of the etched stitching or pattern 281 of FIG. 28, i.e. with a backlighting. Reference sign 331 of FIG. 33 indicates an etched logo and/or corporate name without backlighting. Reference sign 332 of FIG. 33 indicates an enlarged representation of a part of the etched logo and/or corporate name 331. Reference sign 341 in FIG. 34 indicates an etched stitching or pattern without backlighting. Reference sign 342 of FIG. 34 indicates an etched logo and/or corporate name without backlighting. Reference sign 343 of FIG. 34 indicates an enlarged representation of a part of the etched logo or corporate name 342. FIG. 35 shows a material stack-up that yield a great contrast. FIGS. 35 and 36 represent compression molded substrates.

Figure 37:
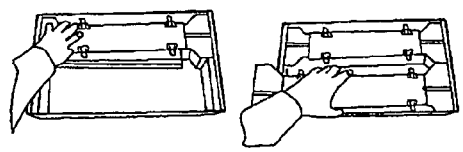
FIGS. 37 to 95 show production means and methods for the production of laser treated graphic elements and/or patterns.
Figure 40:
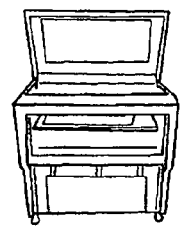
Figure 38:
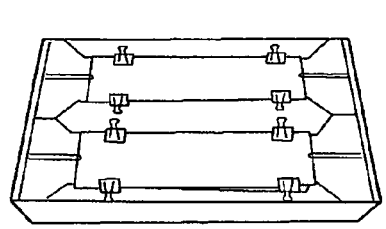
Figure 39:
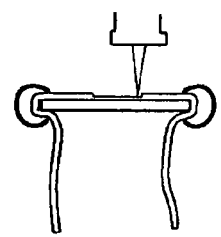
Figure 41:
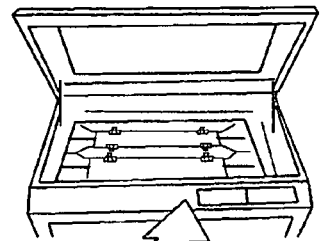
Figures 94, 95:
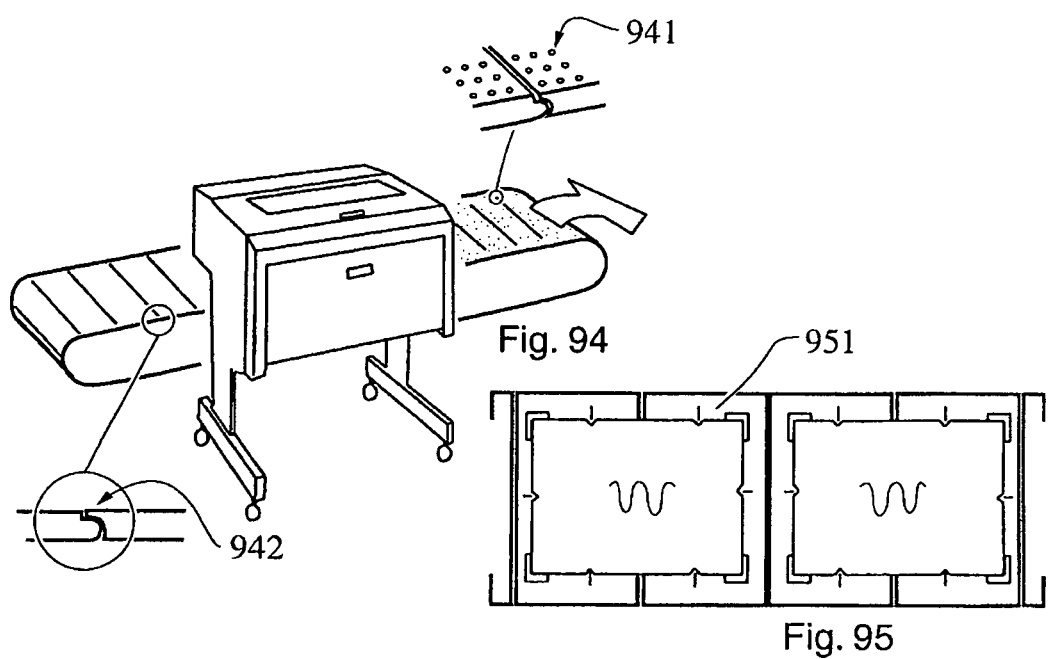

In FIGS. 37 to 95 different production means and methods for the production of laser treated graphic elements and/or patterns are shown. One challenge in the production of such laser treated graphic elements and/or patterns is to reduce the laser cycle time, i.e. enhancing the laser etching cycling capability. According to the present invention, smart fixtures and smart fixture means are suggested in order to provide such an enhancement of the laser etching cycling capability.

One aspect thereof is to nest multiple components to enhance the laser etching cycling capability. Typically, the bed of a laser machine (i.e. the horizontal extension of the laser machine) is a fixed size, while the depth of the laser bed can be adjusted in vertical direction to accommodate larger or smaller components. The present invention proposes to stack the components so that the un-etched surfaces are stored in vertical space. The stacking of the trim components so that only the desired etched surface is exposed will enable multiple components to be etched within the same cycle run, hence minimizing motion penalties from both the laser and the operator as the exposure of only the etched surface will minimize the travel time of the laser between the components. According to the present invention, it is preferred that the operator is able to quickly align and secure the components within the fixture by way of but not limited to notches, tick marks, nesting shapes, laser light locators, vacuum, suction, air pressure, magnets (electro and earth). During the etching cycle, the operator has the opportunity to load another fixture. The preferred fixture materials according to the present invention include light weight materials made, e.g. from composites, wood, metal or any other smart material. The relative positioning of components to be etched (i.e. the loaded fixture means) on the one hand and the laser machine on the other hand is preferably provided by means of a sliding system and/or a conveyor system and/or by means of suction and/or by means of vacuum and/or by means of inserting manually or in an automated fashion to the laser machine.

FIGS. 37 to 41 show generally an embodiment for positioning of components to be etched. An operator can quickly align trim panel notches to fixture template and then insert into lightweight fixture housing. The housing of the fixture can be placed inside the laser etching machine and locked in place to ensure consistency and repeatability. Due to the depth of the machine in vertical direction, it is possible to accommodate the component material in draped fashion rather than folded or crushed fashion. According to variants of such an embodiment, shown in FIGS. 65 to 71, the fixture means can be provided variable in length and/or width such that the locations to be etched can be brought together to avoid unnecessary movements of the laser beam device. Reference sign 651 in FIG. 65 indicates the possibility to have laser specific zones of any shape and size. Reference sign 652 in FIG. 65 indicates that the material can gather in a fixture cavity. Reference 661 in FIG. 66 indicate windows for such parts of the material that are not etched. Reference sign 671 of FIG. 67 indicate the alignment of the material in the fixture. Reference sign 681 of FIG. 68 indicates that fixture lids are flipped down to secure a desired etching surface. Reference sign 691 of FIG. 69 indicates flipping down or collapsing a center portion of the fixture. Reference sign 701 of FIG. 70 indicate arrows representing a translation of parts of the fixture of relative to one another to reduce the overall package size. FIG. 71 indicates that it is possible to take multiple fixtures/components in a laser machine.

Figure 42:
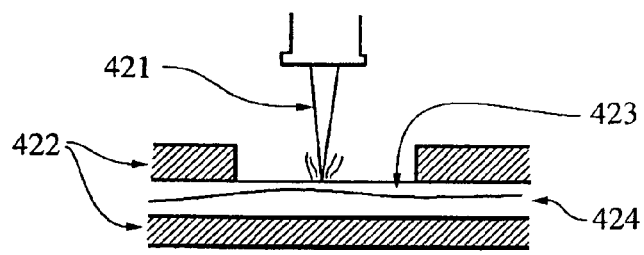
Figure 43:
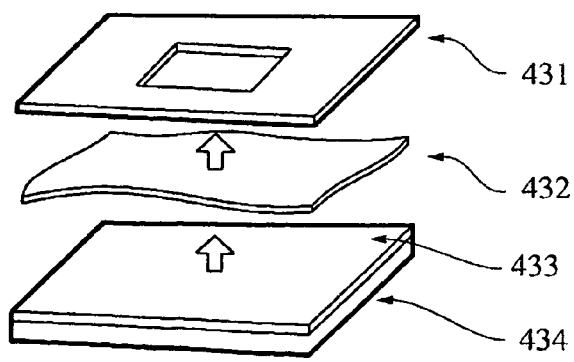
Figure 49:
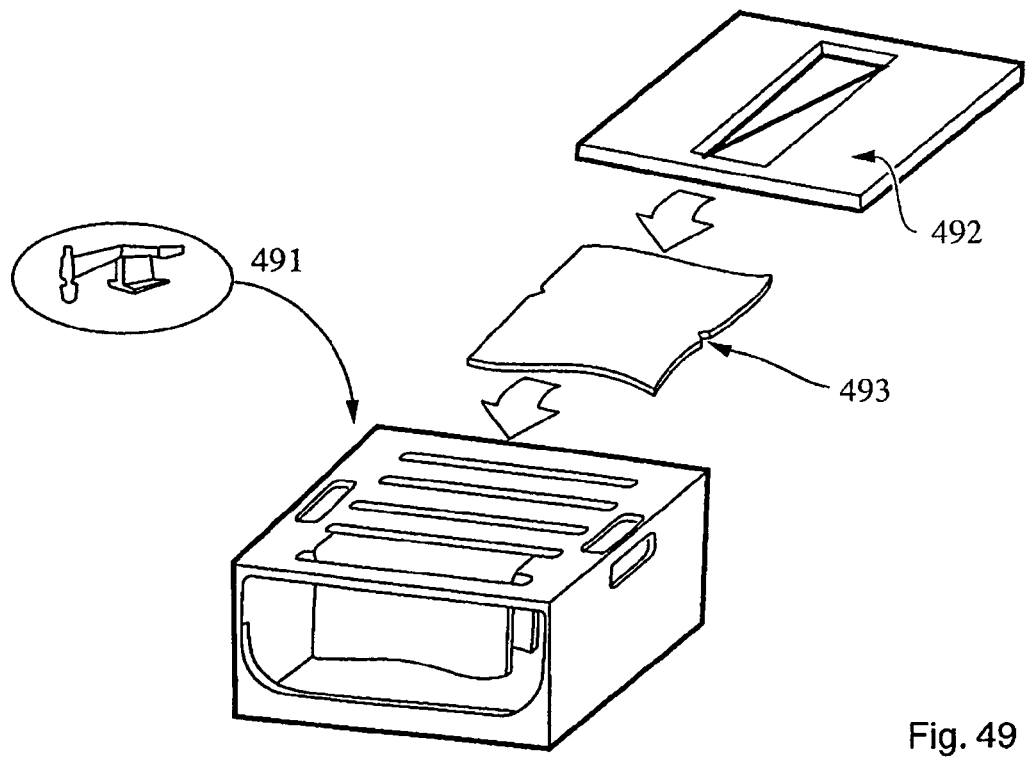
Figures 76, 77, 78:
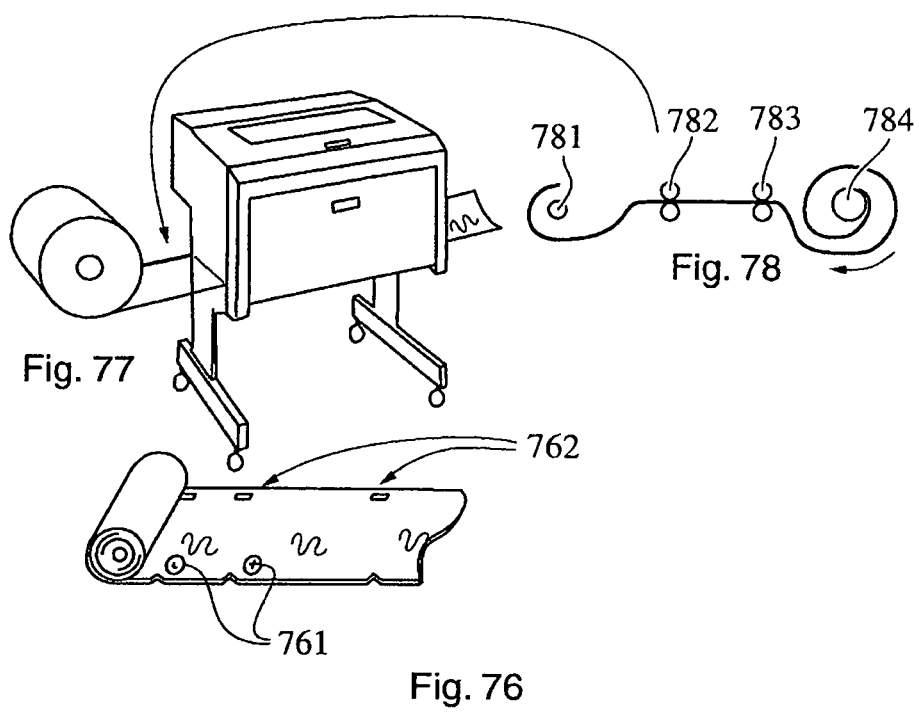

FIGS. 42 and 43 show an embodiment of a fixture for maintaining soft materials having thinner or thicker sections as material variances. By using a rigid fixture plate above and another rigid fixture plate below the material section to be etched, it is possible to easily and precisely hold the material to be etched. The fixture plate on the side of the laser machine (usually the upper fixture plate) preferably comprises an opening (or window) precisely defining the area where etching is to be applied. Reference sign 421 of FIG. 42 indicates a laser or laser beam. Reference sign 422 of FIG. 42 indicates a rigid fixture. Reference sign 423 of FIG. 42 indicates a trim material. Reference sign 424 of FIG. 42 indicates a soft substrate. Reference sign 431 of FIG. 43 indicates a rigid fixture plate. Reference sign 432 of FIG. 43 indicates a trim material. Reference sign 433 of FIG. 43 indicates a soft substrate. Reference sign 434 of FIG. 43 indicates a rigid fixture. According to the device represented in FIGS. 42 and 43, it is possible to maintain in a consistent distance between an A-surface and the laser. The soft substrate material compensate for thinner or thicker sections within the material variance. Corresponding fixture means are depicted in FIGS. 49 to 64 (showing the possibility of folding a multitude of different pieces of the material to be etched such that a plurality of regions to be etched can be arranged near another and thus reducing cycling times of the laser etching machine; such an arrangement of the material to be etched means that the material is located at different heights (with respect to the source of the laser beam) it can be preferred to provide for a relative adjustment in vertical direction (of either the material to be etched or of the laser beam) or for an adjustment of the focusing characteristics of the laser beam), FIGS. 79 to 80 (a spring means or a plurality of spring means is used to compress and to position the material to be etched) and FIGS. 89 to 91 (where a plurality of layers of the material to be etched are positions one above the other and after each laser etch cycle, the top-most material layer is removed to expose the next layer of the material; the etched material can be removed by means of an operator (i.e. manually), or by means of vacuum suction or by means of an adhesive; likewise, a relative positioning in the vertical direction can be applied between the material to be etched and the layer beam source). Reference sign 491 of FIG. 49 indicates a clamp down template with fixture locks. Reference sign 492 of FIG. 49 indicates a template that locks down to secure the trim material in place. Reference sign 493 of FIG. 49 indicates the trim material having notched details for a quick alignment. FIG. 49 generally indicates that it is possible to insert a lightweight fixture in a laser etcher. Reference 501 of FIG. 50 indicates the effect of a program software to translate either the table or the fixture or the laser head into the Z direction in order to maintain laser consistency for different regions to be etched at different heights (variations in the Z-direction). Reference sign 502 of FIG. 50 indicates that it is possible that such regions or areas of the material that are not to be etched can gather in a fixture cavity. Reference sign 511 of FIG. 51 indicates the alignment of the material to be etched in the fixture. Reference sign 521 of FIG. 52 indicates that it is possible to flip a fixture lid down to hold the material in place. Reference sign 531 of FIG. 53 indicates an alignment of a second trim panel on the fixture. Reference sign 541 of FIG. 54 indicates to flip the second fixture lid down to hold the material in place. Reference sign 551 of FIG. 55 indicates the alignment of a third trim panel on the fixture. Reference sign 561 of FIG. 56 indicate the exposed portions of the material for the laser etching. Reference sign 562 of FIG. 56 indicates that it is possible to flip the third fixture lid down to hold the material in place. Reference sign 571 of FIG. 57 indicates the possibility to use a program software to translate the laser head to each specific material. The laser head remains in one plane. Reference sign 572 of FIG. 57 indicates that a material can gather in the fixture cavity. Reference 581 of FIG. 58 indicates the alignment of a material in the fixture. Reference sign 591 of FIG. 59 indicates to flip the first fixture lid down for the second material to be placed. Reference sign 601 of FIG. 60 indicates the alignment of a second trim panel on the fixture. Reference 611 of FIG. 61 indicates to flip the second fixture lid down for the third material placement. Reference sign 621 of FIG. 62 indicates the alignment of the third trim panel on the fixture. Reference sign 631 indicates to flip the third fixture lid down to hold the material in place. Reference sign 632 of FIG. 63 indicates the exposed material for the laser etching process. Reference sign 641 of FIG. 64 indicates to translate the laser in Z-direction, which makes it possible to stack the material to increase the output of the laser etching operation. Reference sign 642 of FIG. 64 indicates alignment notches. Reference sign 791 of FIG. 79 indicates a material variation. Reference 801 of FIG. 80 indicates a laser or a laser beam. Reference sign 802 of FIG. 80 indicates an exposed etched surface for an exposed surface to be etched. Reference sign 803 of FIG. 80 indicates that it is possible to apply a spring force to compress uneven materials. This is especially important to maintain a planar relationship between the laser and the A-surface of the material to be etched, i.e. the material surface that is visible to a user. FIG. 89 shows a possibility of a laser etching operation according to the present invention where in a first step the top surface of the top layer of a stack is processed, the stack comprising a plurality of different layers of the material which is to be etched. In a second step, the top layer is removed and the next layer etched. After etching the top layer, removing the top layer can for example be done by means of a manual operation of an operator, and/or by the application of vacuum and/or by the application of a suction operation. Reference sign 891 indicates to translate the laser head in Z-direction prior to each laser cycle. Reference sign 911 indicates to push the material up via a spring or another device.

Figure 44:
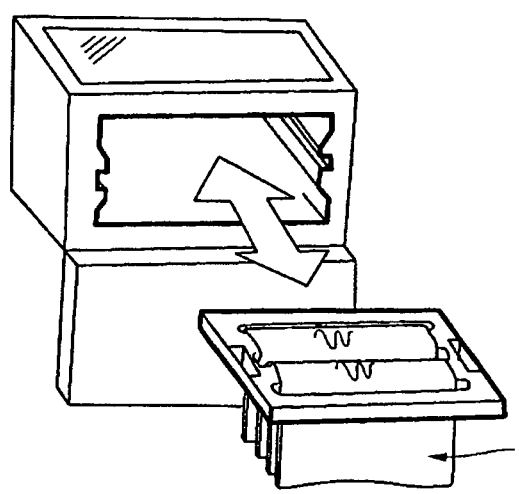
Figure 46:
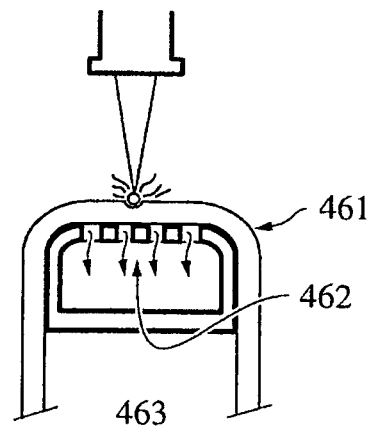
Figure 45:
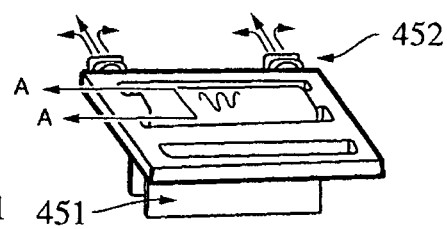
Figure 47:
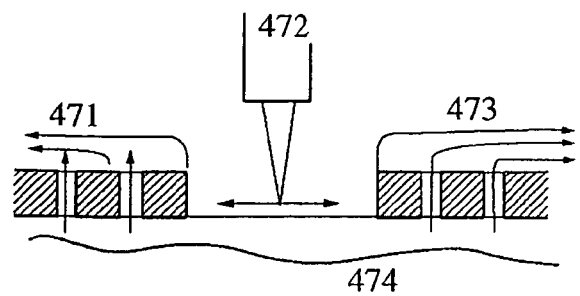
Figure 48:
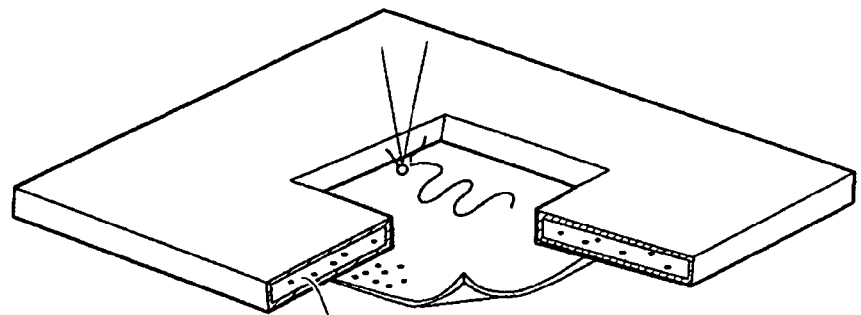

FIGS. 44 to 48 show fixtures means having a vacuum means for suction of air such that the material to be etched can be held in place easily. It is possible according to the present invention to use a plurality of trays such that one tray can be slid into the laser etching machine and at least another tray can be loaded outside of the laser etching machine. For example, a vacuum suction can be provided from one side and the laser etching occurs from the opposite side of the material to be etched. Reference sign 441 of FIG. 44 indicates a trim material. FIG. 44 represents a possibility where trays can slide into the laser etching machine and secondary trays can be loaded offline in order to enhance the operation cycle of the laser etching machine. Reference sign 451 of FIG. 45 indicates the trim material. Reference sign 452 of FIG. 45 indicates vacuum vents that are linked to the laser etching vacuum system. Reference sign 461 of FIG. 46 indicates the trim material. Reference sign 462 of FIG. 46 indicates that by means of a vacuum, the material is pulled into a holding position, securing it both in place and flat. Reference sign 461 of FIG. 46 indicates a section A. Reference sign 474 of FIG. 47 indicates the material to be etched. Reference sign 471 and 473 indicate to pull air by means of a suction unit to provide a vacuum that draws the material to be etched up towards towards a defined laser etching plane. Reference sign 472 indicates the laser or the laser beam. Reference sign 481 of FIG. 48 indicates the material suction.

Figure 86:
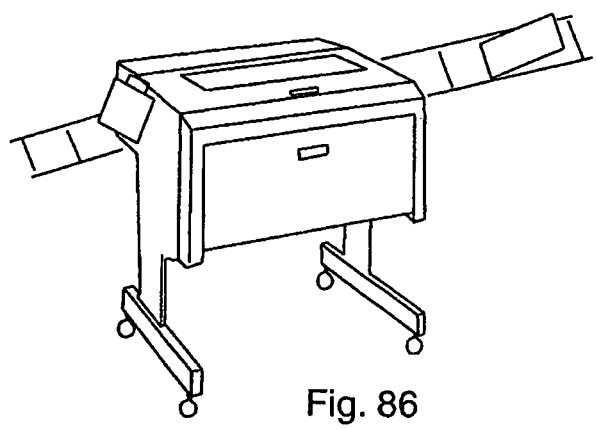
Figure 87:
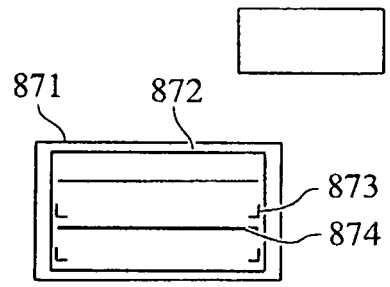
Figure 88:
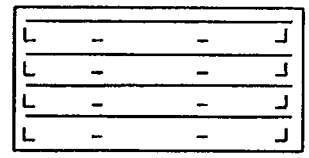

FIGS. 76 to 78, 81 to 83, 85 and 92 to 95 show embodiments comprising at least one conveyor to transport the material to be etched to the laser machine. For example, it is preferred according to the present invention (cf. especially FIGS. 76 to 78) that when using such a conveyor or conveyor means, the material to be etched comprises holes or other openings or other structures such as notches, ticks or slits (and especially in scrap areas of the material to be etched) such that such holes or openings or other structures can be used for alignment purposes. Furthermore, the material to be etched can comprise markings for indicating pattern locations. Reference sign 761 of FIG. 76 indicates markings for pattern locations. Reference sign 762 of FIG. 76 indicate that it is possible to add holes to the fabric or the material to be etched in a scrap area such that the fabric can be aligned. These alignment features can be holes, notches, ticks, slits or the like. Reference sign 781 of FIG. 78 indicates a take-up roller. Reference signs 782 and 783 of FIG. 78 indicate tension rollers. Reference sign 784 of FIG. 78 indicates a feed roller. Reference sign 831 of FIG. 83 indicates a fixture plate that holds the material in place. Reference sign 832 indicates to minimize a gap or a door that closes when the laser is active. Reference sign 851 of FIG. 85 indicates a material lane. Reference sign 852 of FIG. 85 indicates a laser box. Reference sign 853 indicates a conveyer. Reference sign 854 indicates a self-release-zone. Reference sign 855 of FIG. 85 indicates a box of finished parts. FIGS. 86, 87 and 88 indicate another embodiment of fixing a material to be etched. Reference sign 871 of FIG. 87 indicates a table. Reference sign 872 of FIG. 87 indicates a fixture. Reference sign 873 of FIG. 87 indicate a distance element. Reference sign 874 of FIG. 87 indicates a slit for the material to be etched. Furthermore, it is preferred according to the present invention (cf. especially FIGS. 81 to 83, 85, and 94 to 95) that when using such a conveyor or conveyor means, a fixture plate or other fixture means is conveyed with the conveying means and the material to be etched is positioned relative to the fixture plate. According to a further alternative embodiment of the present invention, it is preferred (cf. especially FIGS. 92 to 93) that the material to be etched can be fixed or positioned relative to the conveying means such that only such regions of the material to be etched are exposed to the layer beam in a defined manner and that other portions of the material are provided in holes or apertures of the conveying means. Reference sign 921 of FIG. 92 indicates a laser head that can reach multiple components. Reference sign 922 of FIG. 92 indicates a removal panel or a removal fan that blows the etched material pieces into a stock element. Reference sign 923 of FIG. 92 indicates that material can gather in a conveyer cavity. Reference sign 941 of FIG. 94 indicates through holes within the conveyer or within conveyer elements such that air can assist in the correct positioning of the material to be etched by means of the action of a vacuum or by means of a suction or by means of a blowing. Reference sign 942 of FIG. 94 indicates a smart design for a flush lasering surface of the conveyer elements. Reference sign 951 of FIG. 95 indicates different possibilities of alignment features such as ticks, notches, edges, profile nests of the like.

Figure 84:
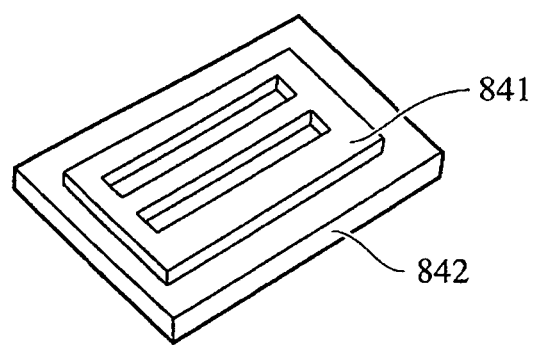
Figure 85:
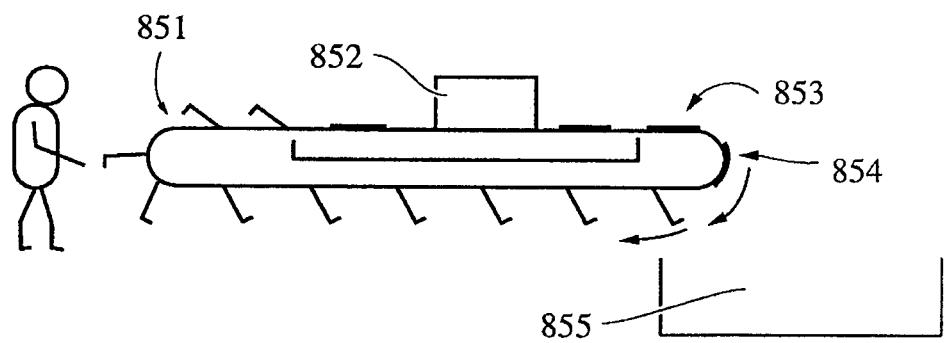

According to the embodiment of FIG. 84, a magnetic field is used to hold the material to be etched. Reference sign 841 of FIG. 84 indicates an area of a negative field and reference sign 842 of FIG. 84 indicates an area of a positive magnetic field. In FIG. 84, a table is used as a conductor to either provide or enhance the magnetic field.

According to FIGS. 72 to 75, the material to be laser etched is held in a three-dimensional fixture, e.g. with convex and/or concave surface or a combination of planar or non-planar surfaces. A variation of the relationship between the material surface on the one hand and the laser focal point on the other hand will yield a gradient look. Reference sign 721 of FIG. 72 indicates a depression within the material to be etched. The depression represents a concave surface in part of the material to be etched. Reference sign 731 of FIG. 73 indicates a laser or a laser beam. Reference sign 732 of FIG. 73 indicates a focal point. Reference sign 733 of FIG. 73 indicates a blurred and/or distorted etching operation of the laser beam. Reference sign 743 of FIG. 74 indicates a three-dimensional-fixture. Reference sign 741 of FIG. 74 indicates a convex portion of the surface of the material to be etched. Reference sign 742 of FIG. 74 indicates a concave portion of the material to be etched. Reference sign 751 of FIG. 75 indicates a suction or action of a vacuum unit for alignment purposes of the material to be etched. Reference sign 752 indicates a three-dimensional fixture. Reference sign 753 indicates a laser focal point.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the embodiments of the present invention as set forth are not intended as being exhaustive or limiting of the invention. The scope of the invention should, therefore, be determined not with reference to the above description, but should instead be determined with reference to the appended Claims, along with the full scope of equivalents to which such claims are entitled. The disclosures of all articles and references, including patent applications and publications, are incorporated by reference for all purposes. The term "consisting essentially of" (or a derivation thereof) to describe a combination shall include the elements, components or steps identified, and such other elements, components or steps that do not materially affect the basic and novel characteristics of the combination. The use of the terms "comprising" or "including" (or derivations thereof) to describe combinations of elements, components or steps herein also contemplates embodiments that consist essentially of (or even consist of) the elements, ingredients, components or steps. Plural elements, ingredients, components or steps can be provided by a single integrated element, ingredient, component or step. Alternatively, a single integrated element, ingredient, component or step might be divided into separate plural elements, ingredients, components or steps. The teachings herein also contemplate methods of using the structures as described, as well as methods that include operational steps performed by the structures herein. Though the use of a single element, component or step is contemplated by the teachings, the disclosure of "a" or "one" to describe an element component or steps is not intended to foreclose additional elements, ingredients, components or steps.

LIST OF REFERENCE SIGNS 1 interior trim, cover of a seat
2 seat back
3 seat
4 soft switch
5 cover of the seat
6 isofix label
7 airbag tag
8 custom branding, logo
8' 2-D element with simulated stitch
8" 3-D-pattern
9 simulated stitch
10 cover of the seat back

The invention claimed is:

1. Process for production of a trim in an interior of a vehicle having a cover with an A-surface directed towards the interior, wherein the A-surface is treated with a laser-beam to apply at least one of a graphic-element and a pattern to the A-surface, wherein a material of the cover is partially fused or removed under influence of the laser-beam, the cover is one or more of a fabric, leather and faux-leather and a color of the cover is locally changed by the laser-beam and,
  wherein a light source is provided to backlight the cover.

2. Process according to claim 1, wherein a tactile of the cover is locally changed by the laser-beam.

3. Process according to claim 1, wherein the pattern is a simulated stitch.

4. Process according to claim 1, wherein the graphic-element is a safety-element.

5. Process according to claim 1, wherein a laser treated part of the cover covers a switch.

6. Process according to claim 1, wherein the material of the cover is positioned by at least one of the following:
  air suction,
  air blowing,
  pressing the material of the cover between at least two plate-like elements,
  magnetic positioning,
  by means of a holding or a fixture frame surrounding the material of the cover to be etched.

7. Process for production of a trim in an interior of a vehicle having a cover with an A-surface directed the interior, wherein the A-surface is treated with a laser-beam to apply at least one of a graphic-element and a pattern to the A-surface, wherein a material of the cover is partially fused or removed under influence of the laser-beam and the material of the cover is positioned relative to the laser-beam at least partly by a conveying means; and
  wherein a light source is provided to backlight the cover.

8. Process according to claim 7, wherein the pattern is a simulated stitch.

9. Process according to claim 8, wherein the pattern is tactile.

10. Process according to claim 7, wherein the graphic-element is a safety-element.

11. Process according to claim 10, wherein the graphic-element is tactile.

12. Process according to claim 7, wherein a laser treated part of the cover covers a switch.

13. Process according to claim 7 wherein the material of the cover is positioned by at least one of the following:
  air suction,
  air blowing,
  pressing the material of the cover between at least two plate-like elements,
  magnetic positioning,
  by means of a holding or fixture frame surrounding the material of the cover to be etched.

14. Process for production of a trim in an interior of a vehicle having a cover with an A-surface directed towards the, wherein the A-surface is treated with a laser-beam to apply one or more of a graphic-element and a pattern to the A-surface, wherein a material of the cover is partially fused or removed under influence of the laser-beam, the cover is one or more of a fabric, leather and faux-leather and the material of the cover is positioned relative to the laser-beam at least partly by a conveying means; and
  wherein a light source is provided to backlight the cover.

* * * * *